United States Patent
Fajardo et al.

(10) Patent No.: US 7,082,242 B2
(45) Date of Patent: Jul. 25, 2006

(54) MULTIPLE CORE MICROSTRUCTURED OPTICAL FIBERS AND METHODS USING SAID FIBERS

(75) Inventors: James C. Fajardo, Painted Post, NY (US); Michael T. Gallagher, Corning, NY (US); James A. West, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 221 days.

(21) Appl. No.: 10/356,454

(22) Filed: Jan. 31, 2003

(65) Prior Publication Data

US 2004/0151454 A1 Aug. 5, 2004

(51) Int. Cl.
*G02B 6/02* (2006.01)

(52) U.S. Cl. .................. 385/127; 383/126; 383/95; 383/97; 383/98; 383/124

(58) Field of Classification Search ................ 385/122, 385/123, 124, 125, 126, 127, 128, 95, 97, 385/98, 129, 96
See application file for complete search history.

(56) References Cited

U.S. PATENT DOCUMENTS 4,765,704 A * 8/1988 Pers ........................ 385/139
5,802,236 A 9/1998 DiGiovanni et al.
6,301,420 B1 10/2001 Greenaway et al. ........ 385/126
2002/0061176 A1 * 5/2002 Libori et al. ................ 385/125
2005/0069269 A1 * 3/2005 Libori et al. ................ 385/125

FOREIGN PATENT DOCUMENTS

| JP | WO 02/26648 | 4/2002 |
| JP | WO 02/063350 | 8/2002 |
| JP | WO 02/071038 | 9/2002 |
| WO | WO 02/084350 | 10/2002 |
| WO | WO 02/088801 | 11/2002 |

OTHER PUBLICATIONS

"Photonic Crystal Fibers", Russell, Philip; Applied Science; vol. 299, Jan. 17, 2003; pp. 358-362 XP002286085.
Knight et al., "New Ways to Guide Light", Apr. 12, 2002, Science, vol. 296, pp. 276-277.

* cited by examiner

*Primary Examiner*—Brian Healy
(74) *Attorney, Agent, or Firm*—Suetlana Z. Short

(57) ABSTRACT

The present invention relates to a microstructured optical fiber including a photonic band gap-guided core; and at least one index-guided core. Another embodiment of the present invention relates to a microstructured optical fiber including a set of main cores; a microstructured region surrounding the set of main cores; and at least alignment core, the alignment cores having substantially different optical propagation properties than the main cores. The present invention also includes methods for coupling, monitoring, and locating discontinuities in the fibers of the present invention.

19 Claims, 7 Drawing Sheets

MULTIPLE CORE MICROSTRUCTURED OPTICAL FIBERS AND METHODS USING SAID FIBERS

BACKGROUND OF THE INVENTION

1. Field of the Invention

The present invention relates generally to optical fibers, and more specifically to microstructured optical fibers, methods for locating discontinuities in microstructured optical fibers, methods for monitoring the draw of microstructured optical fibers, and methods for coupling microstructured optical fibers.

2. Technical Background

Optical fibers formed completely from glass materials have been in commercial use for more than two decades. Although such optical fibers have represented a leap forward in the field of telecommunications, work on alternative optical fiber designs continues. One promising type of alternative optical fiber is a microstructured optical fiber, which includes holes or voids running longitudinally along the fiber axis. The holes generally contain air or an inert gas, but may also contain other materials.

Microstructured optical fibers may be designed to have a wide variety of properties, and may be used in a wide variety of applications. For example, microstructured optical fibers having a solid glass core and a plurality of holes disposed in the cladding region around the core have been constructed. The arrangement, spacings and sizes of the holes may be designed to yield microstructured optical fibers with dispersions ranging anywhere from large negative values to large positive values. Such fibers may be useful, for example, in dispersion compensation. Solid-core microstructured optical fibers may also be designed to be single mode over a wide range of wavelengths. Solid-core microstructured optical fibers generally guide light by a total internal reflection mechanism; the low index of the holes can be thought of as lowering the effective refractive index of the cladding region in which they are disposed.

One especially interesting type of microstructured optical fiber is the photonic band gap fiber. Photonic band gap fibers guide light by a mechanism that is fundamentally different from the total internal reflection mechanism. Photonic band gap fibers have a photonic band gap structure formed in the cladding of the fiber. The photonic band gap structure may be, for example, a periodic array of holes having a spacing on the order of the wavelength of light to be propagated in the fiber. The photonic band gap structure has a range of frequencies and propagation constants, known as the band gap, for which light will not propagate in the photonic band gap structure. The core of the fiber is formed by a defect in the photonic band gap structure cladding. For example, the defect may be a hole of a substantially different size and/or shape than the holes of the photonic band gap structure. Alternatively, the defect may be a solid structure embedded within the photonic band gap structure. Light introduced into the core will have a propagation constant determined by the frequency of the light and the structure of the core. Light introduced into the core of the fiber having a frequency and propagation constant within the band gap of the photonic crystal structure will not propagate in the photonic band gap cladding, and will therefore be confined to the core. A photonic band gap fiber may have a core that is formed from a hole larger than those of the surrounding photonic band gap structure; in such a hollow-core fiber, the light may be guided substantially in a gaseous medium, lowering losses due to absorption and Rayleigh scattering of glass materials.

The propagation of light in a hollow core photonic band gap fiber is strongly dependent on the hole size, pitch, and symmetry of the photonic band gap structure. A slight change in the photonic band gap structure may perturb its properties such that a light propagating in the core is no longer forbidden to propagate in the photonic band gap structure, destroying the light-guiding properties of the fiber. In fabrication of a photonic band gap fiber, it is necessary to draw the fiber with a high degree of precision, so that the desired band gap properties are achieved.

It is difficult to perform diagnostic measurements on hollow core photonic band gap fibers. If a fiber does not guide light, it may be due to a break in the fiber, or due to a shift of the band gap caused by a deviance from the desired fiber structure. The band gap may be shifted to a wavelength outside the measurement range (e.g. by an incorrect scaling of the photonic band gap structure during the drawing of the fiber). Alternatively, the band gap may be destroyed by disorder in the photonic band gap structure. If the fiber does not guide light, standard methods of measuring fiber properties cannot be used.

Microstructured optical fibers (both photonic band gap fibers and index-guided fibers) may support guided modes that are not circularly symmetric. In one conventional type of solid core microstructured optical fiber, a solid core region is surrounded by a plurality of holes formed in a cladding material. The holes nearest the core region may be disposed, for example, in a regular hexagon around the core region. The core of this conventional microstructured fiber supports a guided mode having a somewhat hexagonal shape (i.e., having a $C_6$ rotation axis). When splicing or otherwise coupling together two lengths of such fibers together, it is not only necessary to align the cores positionally; it is also necessary to rotationally align the fibers so that the propagation modes of the two fibers are in substantial rotational alignment.

SUMMARY OF THE INVENTION

The present invention relates to a microstructured optical fiber including a photonic band gap-guided core; and at least one index-guided core.

One embodiment of the present invention relates to a method of locating a discontinuity in a microstructured optical fiber, the microstructured optical fiber having a photonic band gap-guided core and at least one index-guided core, the method including the steps of introducing light into at least one of the index-guided cores; allowing the light to interact with the discontinuity; and detecting the light.

Another embodiment of the present invention relates to a method of monitoring a property of a microstructured optical fiber during the drawing thereof, the microstructured optical fiber having a photonic band gap-guided core and at least one index-guided core, the method including the steps of allowing a light beam to interact with the at least one index-guided core; and detecting the light beam.

Another embodiment of the present invention relates to a microstructured optical fiber including a set of main cores; a microstructured region surrounding the set of main cores; and at least alignment core, the alignment cores having substantially different optical propagation properties than the main cores.

Another embodiment of the present invention relates to a method of coupling an end of a first microstructured optical fiber to an end of a second microstructured optical fiber, each microstructured optical fiber having a main core and at least one alignment core, the method including the steps of positioning the end of the first microstructured fiber facing the end of the second microstructured optical fiber; coupling an optical signal into at least one of the alignment cores of the first microstructured optical fiber; detecting the light emerging from the at least one of the alignment cores of the second microstructured optical fiber; and moving the end of the first microstructured optical fiber relative to the end of the second microstructured optical fiber.

The methods and optical fibers of the present invention result in a number of advantages over prior art microstructured optical fibers and methods. For example, the photonic band gap-guided core or the main core may be designed for a particular end use (e.g. telecommunications, data transfer, energy conduction) of the fiber, while a monitoring, splicing, or diagnostic function can be enabled by the at least one index-guided core or the at least one alignment core. The index-guided core or the alignment core can be designed to guide a different wavelength than the photonic band gap-guided core or the main core. The index-guided core or the alignment core may have a much larger area than the photonic band gap-guided core or the main core, simplifying the initial steps of an active alignment process. In splicing the microstructured optical fibers of the present invention, the propagating modes of the main core or photonic band gap-guided cores can be rotationally aligned by active alignment of the index-guided cores or the alignment cores. The microstructured optical fibers of the present invention enable the use of optical time domain reflectometry and visible light scattering techniques in diagnostic measurements of hollow-core photonic band gap fibers.

Additional features and advantages of the invention will be set forth in the detailed description which follows, and in part will be readily apparent to those skilled in the art from the description or recognized by practicing the invention as described in the written description and claims hereof, as well as in the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings are not necessarily to scale, and sizes of various elements may be distorted for clarity. The drawings illustrate one or more embodiment(s) of the invention, and together with the description serve to explain the principles and operation of the invention.

DETAILED DESCRIPTION OF THE PREFERRED EMBODIMENTS

Figure 1:
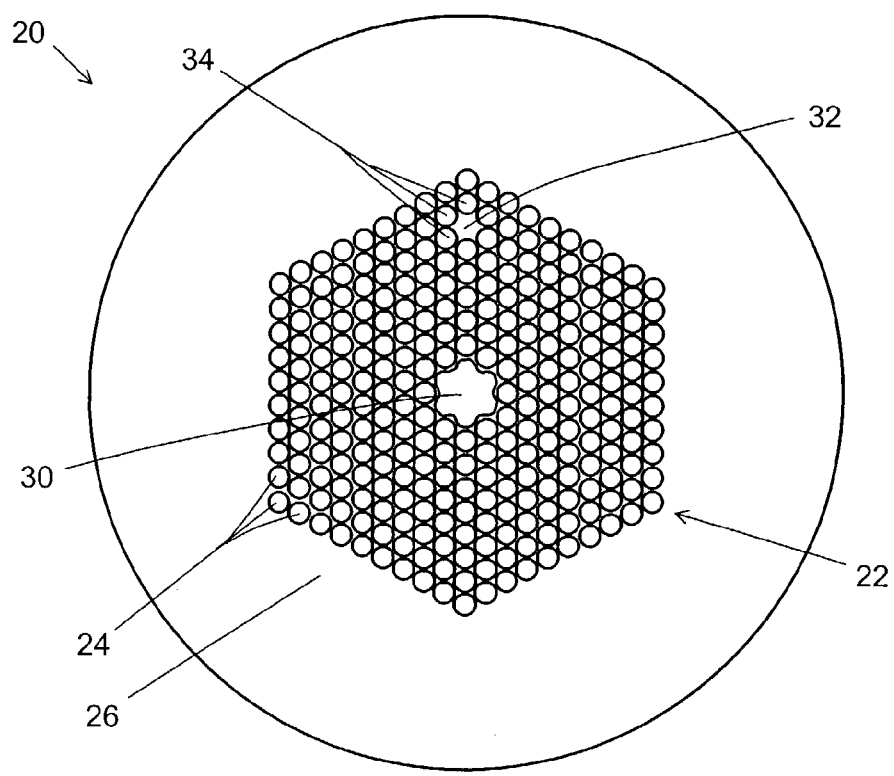
FIG. 1 is a cross-sectional schematic view of a microstructured optical fiber having a photonic band gap-guided core and an index-guided core.

The present invention relates to a microstructured optical fiber having a photonic band gap-guided core; and at least one index-guided core. An example of a microstructured optical fiber according to one embodiment of the invention is shown in cross-sectional view in FIG. 1. Microstructured optical fiber 20 includes a photonic band gap structure 22 formed as a periodic array of holes 24 formed in matrix material 26 of the fiber. Photonic band gap structure 22 has a set of frequencies and propagation constants for which propagation through the band gap structure is essentially forbidden. This set of frequencies and propagation constants is known as the band gap of the photonic band gap structure. Photonic band gap-guided core 30 is provided as a large air-filled hole at the center of the fiber, and is surrounded by photonic band gap structure 22. As used herein, a photonic band gap-guided core is a structure that supports a propagating mode having a frequency and propagation constant within the band gap of the photonic band gap structure surrounding it. Microstructured optical fiber 20 also includes an index-guided core 32. In the embodiment of the invention shown in FIG. 1, the index-guided core is formed from a solid area of matrix material surrounded by a set of holes 34. As used herein, an index-guided core is a structure that supports a guided mode that is confined by a net refractive index effect. The index-guided core has an effective refractive index higher than that of the region surrounding it. As will be described in more detail below, the presence of both a photonic band gap-guided core and an index-guided core in a microstructured optical fiber provides several benefits, including simplified diagnostic testing, on-draw monitoring, and ease of alignment for splicing or connectorization.

In certain embodiments of the invention, the photonic band gap structure is formed as a periodic array of index elements disposed in a matrix material (for example, a siliceous glass material, a non-silica glass material, or a polymer material). The index elements have a substantially different refractive index than the refractive index of the matrix material. For example, in the embodiment shown in FIG. 1, the index elements 24 are disposed in matrix material 26. In one such microstructured optical fiber, index elements 24 are holes, which may be filled with a gas (e.g. air, nitrogen) or a substantial vacuum; however, the holes may also contain a liquid. In such embodiments of the invention, the index elements have a lower refractive index than the refractive index of the matrix material. The index elements 24 may alternatively be solid elements (e.g. a high index glass) disposed in the matrix material. When using solid elements as the index elements, the refractive index of the index elements may be higher than the refractive index of the matrix material. The index elements of photonic band gap structure 22 of FIG. 1 are disposed in a triangular array. The skilled artisan will recognize that the photonic band gap structure may have other geometries; for example, the index elements may be arranged in a square array, or a hexagonal array. The photonic band gap structure has an effective refractive index, defined as $$n_{\textit{eff}} = \sqrt{\sum_{i=1}^{z} f_i \cdot n_i^2}$$

where $n_{\textit{eff}}$ is the effective refractive index, z is the total number of different refractive indices $n_i$ in the photonic band gap structure, and $f_i$ is the volume fraction for refractive index $n_i$. For example, an array of air-filled holes with a 60% volume filling fraction in silica glass has an effective refractive index of about $\sqrt{0.6 \cdot 1.00^2 + 0.4 \cdot 1.444} = 1.198$ at a wavelength of 1550 nm.

Figure 2:
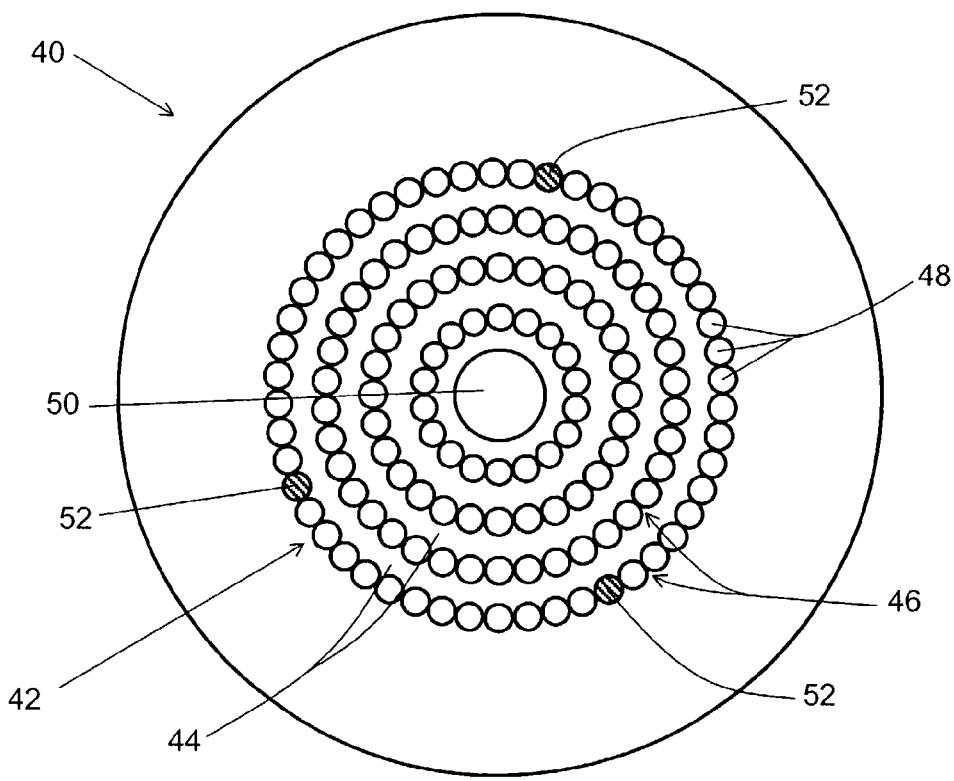
FIG. 2 is a cross-sectional schematic view of a microstructured optical fiber having a photonic band gap-guided core defined by an alternating cylindrical photonic band gap structure, and three index-guided cores.

The photonic band gap structure is not limited to the periodic array of elements described above. Other photonic band gap structures may be used by the skilled artisan in the present invention. For example, the photonic band gap structure may be a cylindrical structure of alternating high and low refractive index regions; as described in "Theory of Bragg fiber," Yeh, P. and Yariv, A, J. Opt. Soc. Am., 68(9), 1196 (1978); "Cylindrical Bragg Fibers: A Design and Feasibility Study for Optical Communications," Doran, N. J. and Blow, K. J., J. Lightwave Tech., LT-1(4), 588 (1983); and U.S. Provisional Patent Application Ser. No. 60/366,452, each of which is hereby incorporated by reference herein in its entirety. One embodiment of such a microstructured optical fiber is shown in FIG. 2. In microstructured optical fiber 40, photonic band gap structure 42 is formed as an alternating series of annular high refractive index regions 44 and low refractive index regions 46. In the embodiment of FIG. 2, the high refractive index regions 44 are layers of substantially undoped silica glass, and the low refractive index regions 46 are formed as rings of index elements 48 in the silica glass. Photonic band gap-guided core 50 is an air-filled region surrounded by photonic band gap structure 42. Microstructured optical fiber 40 also includes three index-guided cores 52. Index-guided cores 52 are regions of germanium-doped silica glass having a sufficiently high refractive index to support a guided mode. Index-guided cores 52 are confined in the circumferential direction by the low refractive index of the holes, and in the radial direction by the substantially undoped silica glass surrounding the index-guided cores. In an alternative embodiment of the invention, the alternating high- and low refractive index regions are formed from solid materials having substantially different refractive indices.

In the embodiments of the invention shown in FIGS. 1 and 2, the photonic band gap-guided cores are hollow cores filled with air. In other embodiments of the invention, the photonic band gap-guided core may be filled with another gas (e.g. nitrogen, argon), or may be substantially evacuated (e.g. less than 20 Torr). Alternatively, the photonic band gap-guided core may be formed from a condensed phase material. For example the photonic band gap-guided core may be filled with a liquid, or may be formed from a solid material. In certain embodiments of the invention, the refractive index of the condensed phase photonic band gap-guided core is less than the effective refractive index of the photonic band gap structure. For use in fiber amplifiers or lasers, it may be desirable for the photonic band gap-guided core to include an active material, such as an Er-doped phosphosilicate glass.

Figure 3:
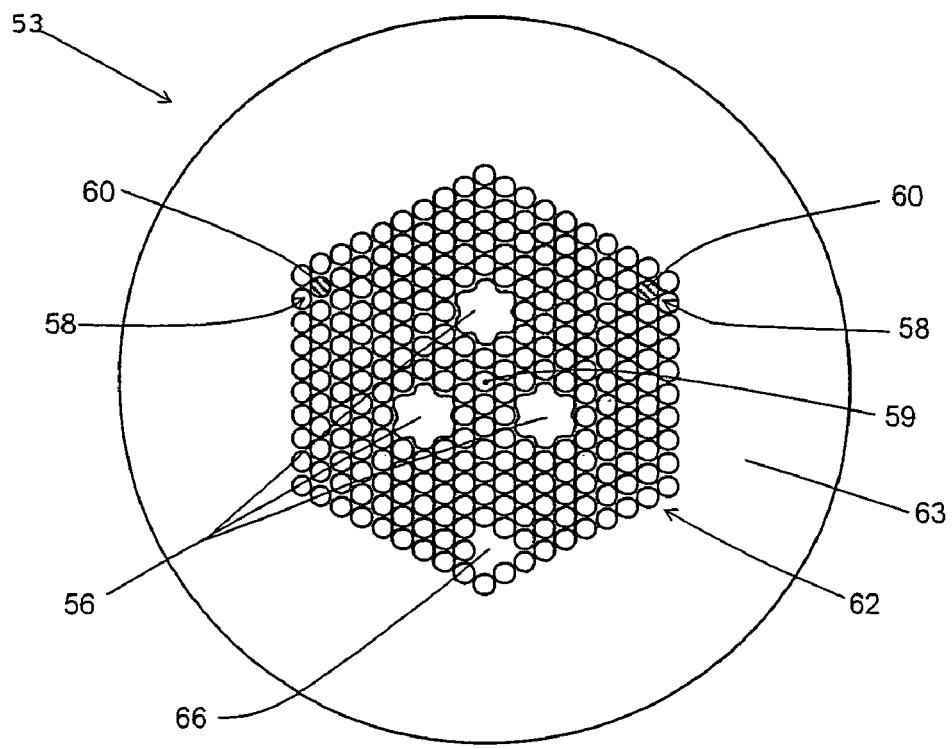
FIG. 3 is a cross-sectional schematic view of a microstructured optical fiber having three photonic band gap-guided cores and three index-guided cores.

The embodiments of the invention shown in FIGS. 1 and 2 have a single photonic band gap-guided core. As shown in these embodiments, it may be desirable for the photonic band gap-guided core to be disposed substantially along the central axis of the microstructured optical fiber. In other embodiments of the present invention, the microstructured optical fiber may include a plurality of photonic band gap-guided cores, which may or may not evanescently couple with one another. In embodiments of the invention with multiple photonic band gap-guided cores, it may be desirable for the multiple photonic band gap-guided cores to be symmetrically disposed around the central axis of the microstructured fiber. For example, FIG. 3 shows a microstructured optical fiber 52 having a nluralitv (for example two or three) photonic band gap-guided cores 56 and three index-guided cores 58. The three photonic band gap-guided cores 56 are symmetrically disposed about the central axis 59 of the fiber.

The microstructured optical fibers of the present invention include at least one index-guided core. The index-guided core is designed so that it supports a propagating mode for a desired wavelength of light. The propagating mode is confined by the difference in the refractive indices of the index-guided core and the region immediately surrounding the index-guided core. The index-guided core may be formed as a disruption of the periodic array of elements of the photonic band gap structure. For example, as shown in FIG. 1, the disruption may be the omission of one or more index elements and replacement with a higher index material. In the embodiment of FIG. 1, one index element is omitted and replaced with matrix material, forming an index-guided core 32 from the matrix material 26 of the photonic band gap structure. A propagating mode is confined by the low effective refractive index of the index elements 24 in the region surrounding index-guided core 32. Alternatively, the disruption may be formed by the substitution of at least one of the index elements of the periodic array with a guiding element. For example, the microstructured optical fiber 52 of FIG. 3 has two index-guided cores 58 formed from the replacement of an index element of photonic band gap structure 62 with guiding element 60. The guiding element may have a higher refractive index than the matrix material of the photonic band gap structure. Alternatively, the guiding element may have a lower refractive index than the matrix material of the photonic band gap structure, but a higher refractive index than the effective refractive index of the photonic band gap structure. An index-guided core may be formed by substitutions or omissions at a group of neighboring lattice points of the photonic band gap structure; for example, index-guided core 66 of microstructured optical fiber 52 is formed from the omission of three neighboring index elements of the photonic band gap structure 62 and replacement by matrix material 63.

Figure 4:
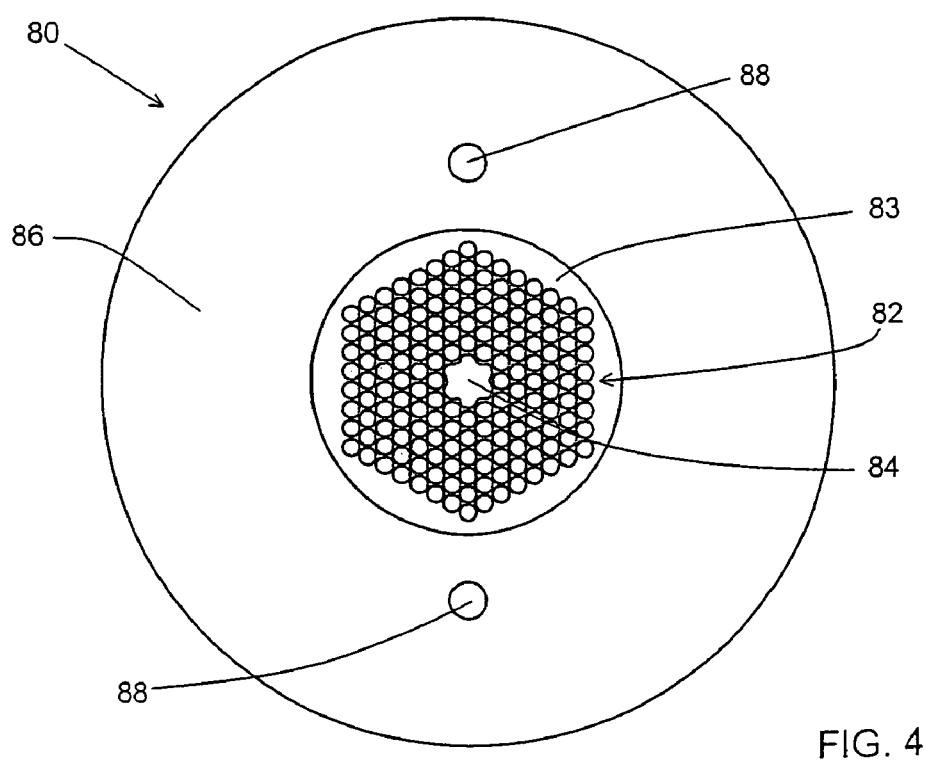
FIG. 4 is a cross-sectional schematic view of a microstructured optical fiber having a photonic band gap-guided core and two index-guided cores formed as regions of high refractive index material embedded in a low refractive index material.

In alternative embodiments of the invention, the index-guided core may be formed as a high refractive index region of solid material embedded in a lower refractive material. For example, FIG. 4 shows a microstructured optical fiber 80 having a photonic band gap structure 82, photonic band gap-guided core 84, and outer cladding 86 surrounding photonic band gap structure 82. Microstructured optical fiber 80 also includes index-guided cores 88, which are embedded in outer cladding material 86 and have a higher refractive index than outer cladding material 86. The matrix material 83 of photonic band gap structure 82 and the index-guided cores 88 may be formed, for example, from substantially undoped silica glass, and the outer cladding material may be fluorine-doped silica glass. Alternatively, the matrix material 83 and the index-guided cores 88 may be formed from germanium-doped silica glass, and the outer cladding material may be substantially undoped silica glass. While in the embodiment illustrated in FIG. 4 the index-guided cores are simple step-index cores, the skilled artisan will recognize that any conventional optical fiber core design may be used in the index-guided cores of the present invention.

Figure 5:
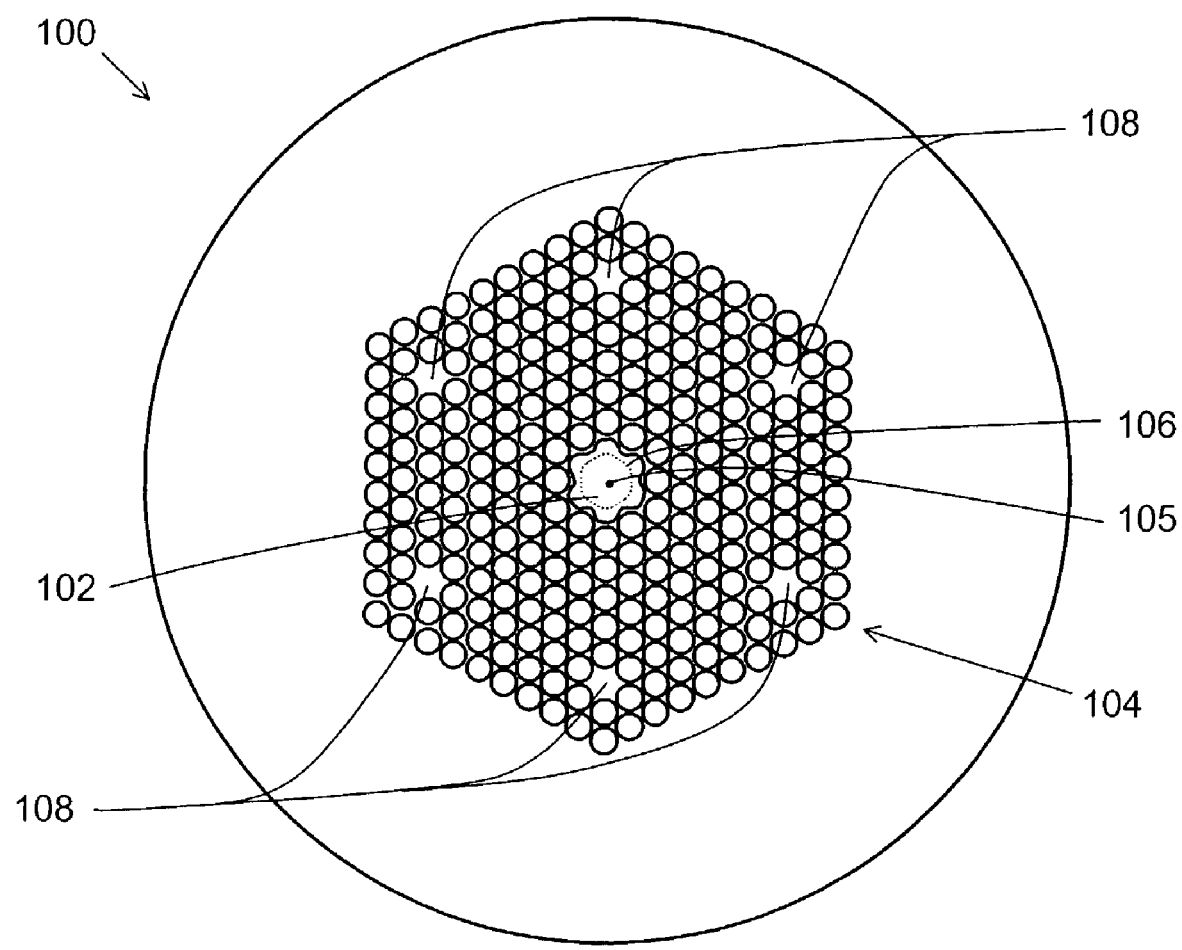
FIG. 5 is a cross-sectional schematic view of a microstructured optical fiber having a photonic band gap-guided core supporting a hexagonally symmetric mode, and six index-guided cores disposed with hexagonal symmetry about the central axis of the fiber.

The shape of a mode guided by a photonic band gap-guided core will depend strongly on the shape and size of the photonic band gap-guided core as well as the structure of the photonic band gap structure surrounding the core. Many photonic band gap-guided cores support propagating modes that are not radially symmetric. For example, FIG. 5 shows a microstructured optical fiber 100 having a photonic band gap-guided core 102 surrounded by a photonic band gap structure 104. The propagating mode 106 has hexagonal symmetry (i.e. a $C_6$ rotation axis at the central axis 105 of the fiber). As will be discussed in further detail below, in order to simplify splicing, it may be desirable to provide a plurality of index-guided cores arranged with substantially the same symmetry around the central axis of the fiber as a propagating mode supported by the photonic band gal-guided core. In the embodiment shown in FIG. 5, microstructured optical fiber 100 has six index-guided cores 108 arranged in a hexagonal fashion; the arrangement of index-guided cores has the same symmetry as the mode supported by the photonic band gap-guided core. In other embodiments of the invention, the mode supported by the photonic band gap-guided core may have a $C_2$ axis; in such a microstructured optical fiber, it would be desirable to symmetrically arrange two index-guided cores on opposite sides of the core. In other embodiments of the invention, the plurality of index-guided cores is arranged with a symmetry that is a fraction of the symmetry of a propagating mode of the photonic band gap core. That is, if the highest symmetry rotation axis of the propagating mode is a $C_x$ rotation axis, the arrangement of index-guided cores has a $C_{(x/n)}$ rotation axis, where x, n, and x/n are integers. Desirably, n is 2, 3, or 4. For example, microstructured optical fiber 80 of FIG. 4 has a photonic band gap-guided core 84 that supports a propagating mode having a $C_6$ rotation axis at the central axis of the Fiber. Index-guided cores 88 are arranged around the central axis of the fiber with a $C_2$ (i.e. $C_{(6/3)}$) rotation axis.

In a microstructured optical fiber of the present invention having a plurality of index-guided cores, it may be desirable to form them such that at least one of the index-guided cores has optical propagation properties (e.g. dispersion, loss, effective area) differing from those of the other index-guided cores. Such a difference would allow the skilled artisan to distinguish among the plurality of index-guided cores. For example, at least one of the index-guided cores may include a material having different spectral characteristics (e.g. absorption spectrum) than the material of the other index-guided cores. Alternatively, at least one of the index-guided cores may have a different size, cross-sectional shape, or refractive index than the rest of the index-guided cores. For example, FIG. 3 shows a microstructured optical fiber 52 having two different types of index-guided cores 60 and 66.

It is desirable for the photonic band gap-guided core to support a photonic band gap-guided mode for at least one wavelength in the range of about 200 nm to about 11 μm. For certain applications, it may be desirable for the photonic band gap-guided core to support a photonic band gap-guided mode for at least one wavelength in the range of about 400 nm to about 2000 nm. It is desirable for the index-guided core to support a index-guided mode for at least one wavelength in the range of about 200 nm to about 11 μm. For certain applications, it may be desirable for the index-guided core to support a index-guided mode for at least one wavelength in the range of about 400 nm to about 2000 nm. Both the photonic band gap-guided core and the index-guided core may individually be single mode or multimode. In designing multiple core microstructured optical fibers for use with these techniques, the index-guided core(s) can be designed somewhat independently from the photonic band gap-guided core. As will be described in more detail below, the microstructured optical fibers of the present invention are especially useful in that they can simplify certain diagnostic, measurement, and coupling operations. The skilled artisan can design the photonic band gap-guided core with reference to the desired end use of the microstructured optical fiber, while designing the index-guided cores for a desired diagnostic, measurement, or coupling process. For example, in an especially desirable embodiment of the present invention, the photonic band gap-guided core supports a single guided mode at a wavelength in the 850–1700 nm wavelength range, while the index-guided core is multimode at a wavelength in the range of 400–800 nm.

In choosing the placement of the index-guided cores, the skilled artisan will recognize that it m-ay be desirable to dispose the index-guided cores sufficiently far from the photonic band gap-guided core so as not to significantly affect the optical propagation properties of the photonic band gap-guided core. For example, it may be desirable for the distance between each index-guided core and the nearest photonic band gap-guided core to be at least about two times the pitch of the periodic array of the photonic band gap structure. In especially desirable embodiments of the present invention, the distance between each index-guided core and the nearest photonic band gap-guided core is at least about four times the pitch of the periodic array of the photonic band gap structure. In certain desired embodiments of the invention, the distance between each index-guided core and the nearest photonic band gap-guided core is at least about 6 μm. In especially desirable embodiments of the present invention, the distance between each index-guided core and the nearest photonic band gap-guided core is at least about 15 μm.

The microstructured optical fibers of the present invention allow the skilled artisan to overcome some of the diagnostic and measurement-related deficiencies of hollow core photonic band gap fibers. One conventional method of locating a discontinuity in the core of an optical fiber is to introduce light into the core at an end of the fiber, detect the light retroreflected from the discontinuity back to the end of the fiber, and use optical time domain reflectometry to determine the position of the discontinuity. This method is not applicable to hollow core photonic band gap fibers, since a discontinuity in a hollow core will generally not provide a surface to cause a retroreflection. In another conventional method for locating a discontinuity in an optical fiber, visible light is guided through the core of the fiber, and is scattered out of the fiber at the discontinuity. An operator can use the visible scattered light to pinpoint the position of the discontinuity. While conventional optical fibers that are designed for telecommunications wavelengths generally guide light at visible wavelengths as well, photonic band gap fibers designed for telecommunications wavelengths do not guide visible light, due to the limited width of the band gap. As such, this method is likewise not universally applicable to hollow core photonic band gap fibers.

Another embodiment of the present invention relates to a method for locating a discontinuity in a microstructured optical fiber having a photonic band gap-guided core and at least one index-guided core. Light is first introduced into at least one of the index-guided cores at an end of the microstructured optical fiber. The light need not be guided in the photonic band gap-guided core; for example, even though the photonic band gap-guided core supports guided modes only in the infrared, visible light can be advantageously used in locating the discontinuity. The light is allowed to propagate along the index-guided core and interact with the discontinuity.

Figure 6:
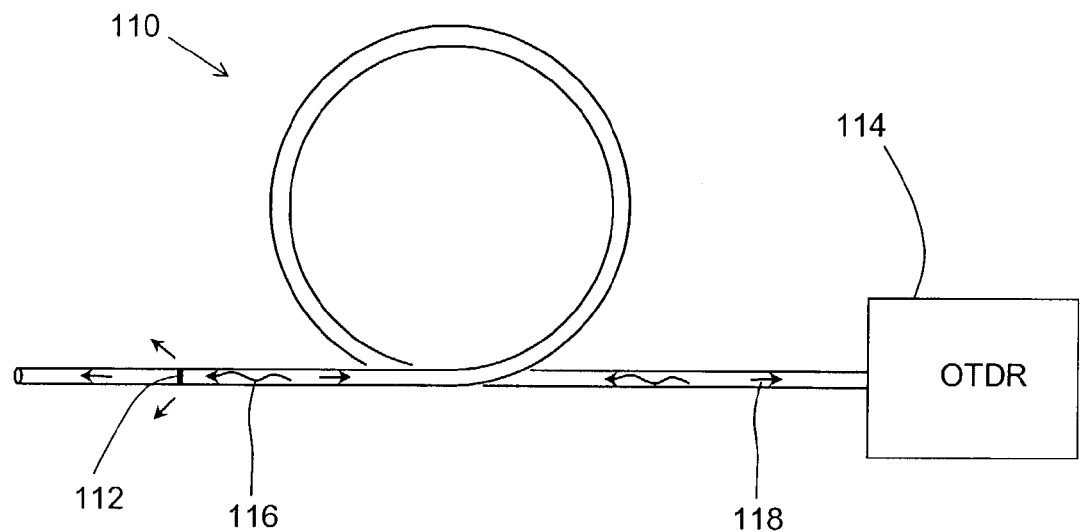
FIG. 6 is a schematic view of an apparatus for locating a discontinuity in a microstructured optical fiber using optical time domain reflectometry according to an embodiment of the present invention.

In one embodiment of the invention, the light is retroreflected by the discontinuity, and detected at the end of the fiber. Optical time domain reflectometry techniques can be used to determine the location of the discontinuity. FIG. 6 shows an apparatus suitable for use in conjunction with this embodiment of the invention. A length of microstructured optical fiber 110 has a discontinuity 112 (e.g. a break held in place by a polymer coating). The microstructured optical fiber includes a photonic band gap-guided core and at least one index-guided core. An optical time domain reflectometer 114 is coupled to at least one index-guided core at an end of the fiber. The optical time domain reflectometer includes a light source configured to send a pulse of light along the fiber, and a light detector configured to detect light coming from the fiber. Light pulse 116 is sent down the index-guided core, and is partially reflected by discontinuity 112, forming reflected light pulse 118, which is detected by the optical time domain reflectometer. The optical time domain reflectometer measures a difference in time between sending light pulse 116 and receiving reflected light pulse 118, and uses the time difference to compute the location of the discontinuity. Conventional optical time domain reflectometers operate at single wavelengths of 850, 1300, 1310, 1360, 1410, 1550, or 1625 nm even if the photonic band gap-guided core does not support a mode at the wavelength of a desired optical time domain reflectometer, the index-guided core may be designed to do so.

Figure 7:
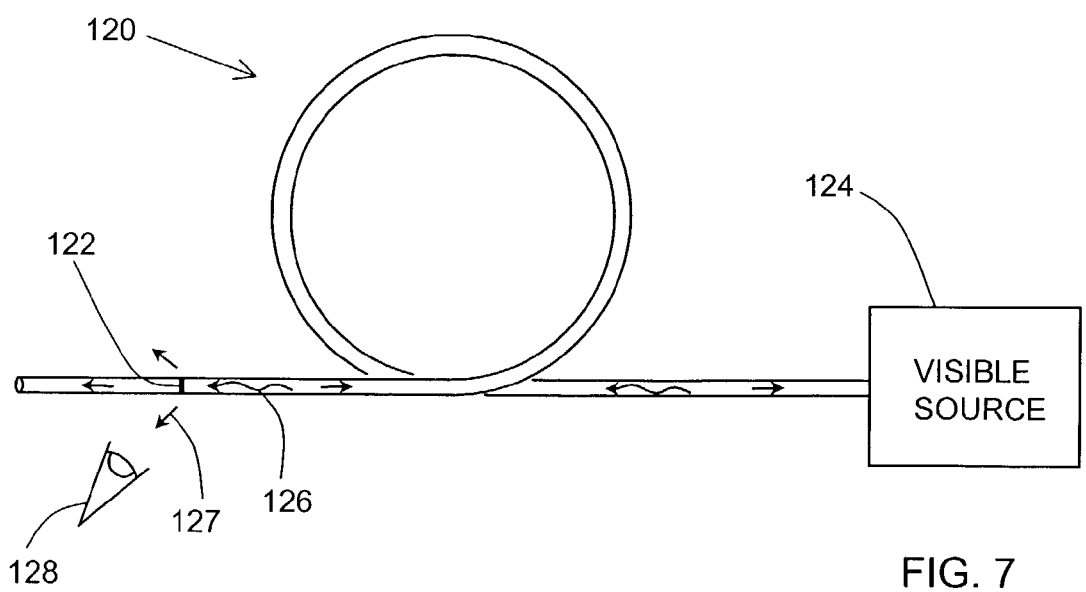
FIG. 7 is a schematic view of an apparatus for locating a discontinuity in a microstructured optical fiber by detecting scattered light according to an embodiment of the present invention.

In another embodiment of the invention, the light may be scattered out of the index-guided core of the fiber by the discontinuity; the scattered light may be detected visually by an operator or by using machine vision techniques. FIG. 7 shows an apparatus suitable for use in conjunction with this embodiment of the invention. A length of microstructured optical fiber 120 has a discontinuity 122 (e.g. a break held in place by a polymer coating). The microstructured optical fiber includes a photonic band gap-guided core and at least one index-guided core. An visible source 124 is coupled to at least one index-guided core at an end of the fiber, and sends visible light 126 down the index-guided core. Visible light 126 is scattered by discontinuity 122, and the scattered light 127 is detected by vision system 128 (e.g. operator's eye, machine vision apparatus). As the skilled artisan will appreciate, other methods for ascertaining fiber continuity may be advantageously used with the fibers of the present invention. For example, light may be launched into the index-guided core at one end of the fiber, and detected at the other end of the fiber.

The index-guided cores of the microstructured optical fibers of the present invention may be used to monitor the fiber during drawing for various attributes. Another embodiment of the invention provides a method of monitoring a property of a microstructured optical fiber of the present invention during the drawing thereof. The method includes the step of allowing measurement light to interact with the index-guided core; detecting the measurement light; and correlating the detected light with the property. As the properties of the photonic band gap-guided core are highly sensitive to changes in scale during the draw, it would be desirable to use feedback control of the fiber drawing process to minimize fluctuations in fiber diameter. The dispersion, cutoff, or nonlinearity of the index-guided cores may be monitored; any changes in the diameter and the microstructure of the fiber may be inferred by the skilled artisan from changes in these properties. Information gained from monitoring the property of the microstructured optical fiber may be fed back to the drawing process in order to more precisely control the properties of the drawn fiber.

Figure 8:
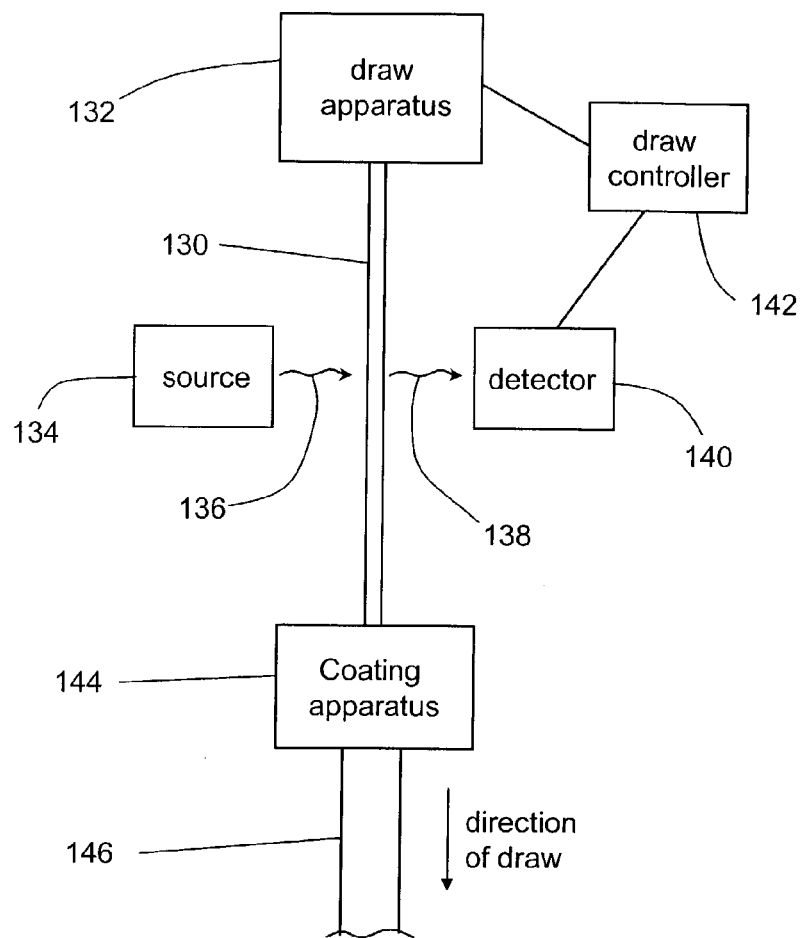
FIG. 8 is a schematic view of an apparatus for monitoring a microstructured optical fiber during the drawing thereof.

The index-guided cores may also be used advantageously in the side monitoring technique described in WO02/071038, which is hereby incorporated herein by reference in its entirety. In this technique, light is focused onto the side of the drawn fiber just after it is drawn and cooled; the light is reflected, scattered, or refracted by the fiber and detected. The spectral qualities of the detected light are dependent on the structure of the fiber. In an especially desirable embodiment of the invention, the index-guided core of the fiber has unique spectral qualities. For example, the index-guided core may be doped with a narrow-band absorber, and have a sharp absorbance band. Changes in the reflected, scattered or refracted light spectrum can be correlated to changes in the properties of the index-guided core, which gives the skilled artisan important information regarding the draw, which can be fed back to control the draw process. An apparatus suitable for use in conjunction with this embodiment of the invention is shown in FIG. 8. Microstructured optical fiber 130, which includes a photonic band gap-guided core and at least one index-guided core, emerges from draw apparatus 132. Light source 134 produces light beam 136, which is allowed to interact with microstructured optical fiber 130 from the side, forming refracted light beam 138, which is detected by detector 140. Light source 134 and detector 140 may include focusing optics, as would be apparent to the skilled artisan. Draw controller 142 receives a signal from detector 140, and compares the signal with the spectral signature of the desired fiber structure. The spectral signature of the desired fiber structure can be determined by the skilled artisan. If the signal is different than the desired spectral signature, draw controller 142 can effect the necessary change in the conditions (e.g. draw tension, furnace temperature, draw speed) of draw apparatus 132. After leaving the area of the light source and the detector, the fiber is coated with one or more layers of polymer by coating apparatus 144, thereby forming coated microstructured optical fiber 146. It may be desirable to use multiple sources and detectors in order to lessen the effects of any fiber rotation during the draw.

The microstructured optical fibers described herein may facilitate alignment during splicing or connectorization. According to one embodiment of the invention, a microstructured optical fiber includes a microstructured region surrounding a set of main cores, and at least one alignment core having substantially different optical propagation properties than the cores of the set of main cores. The main cores are a set of cores (e.g. one or plurality) configured to have properties desirable for a specific end use of the fiber, while the at least one alignment core is configured for use in actively aligning ends of two microstructured optical fibers.

The microstructured region surrounds the main cores of the microstructured optical fibers. The microstructured region may be a photonic band gap structure as described hereinabove. Alternatively, the microstructured region may be an array of index elements in a matrix material that does not support a photonic band gap. The array of index elements may be, for example, a periodic array, a random array, or a ring of index elements.

The set of main cores may include a single core or a plurality of cores. The main cores may be photonic band gap-guided cores as described above, or may be index-guided cores. When a main core is index-guided, it may be surrounded a set of index elements; such cores have desirable dispersion properties, as is known by the skilled artisan. In desirable embodiments of the invention, the set of main cores is symmetrically disposed about the central axis of the fiber. For example, a set of cores having a single main core is desirably located at the central axis of the fiber. A set of main cores having a plurality of main cores desirably has the plurality of main cores symmetrically disposed about the central axis of the fiber. For use in fiber amplifiers, the main cores may include an active material; for example, the main core may be doped with erbium(III) ions. In especially desirable embodiments of the present invention, the main cores are single mode at least one wavelength in the range of 900–1700 nm.

The microstructured optical fiber may also include at least one alignment core. Each alignment core is an index-guided core that has substantially different optical propagation properties than the main cores of the optical fiber. The alignment core may be formed as a disruption in the microstructured region (e.g. one or more missing index elements); or may be formed as a high refractive index material embedded in a lower refractive index material. In desirable embodiments of the invention, the at least one alignment core is disposed far enough away from the set of main cores so as not to substantially effect propagation in the main cores. For example, each alignment core may be at least about 15 microns from the nearest main core. The alignment cores may be single mode or multimode.

Figure 9:
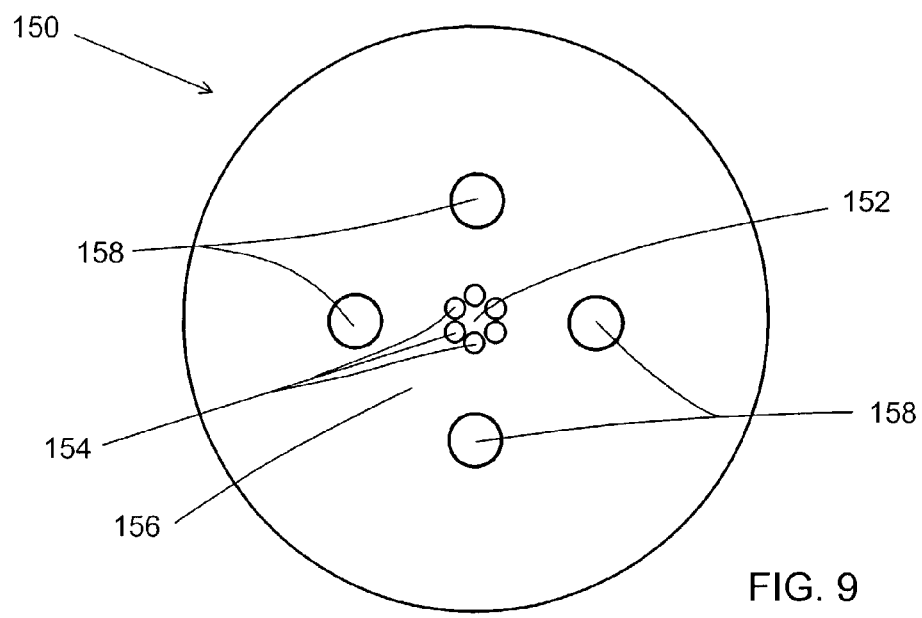
FIG. 9 is a cross-sectional schematic view of a microstructured optical fiber having one main core, a microstructured region formed from a ring of index elements, and four alignment cores.
Figure 10:
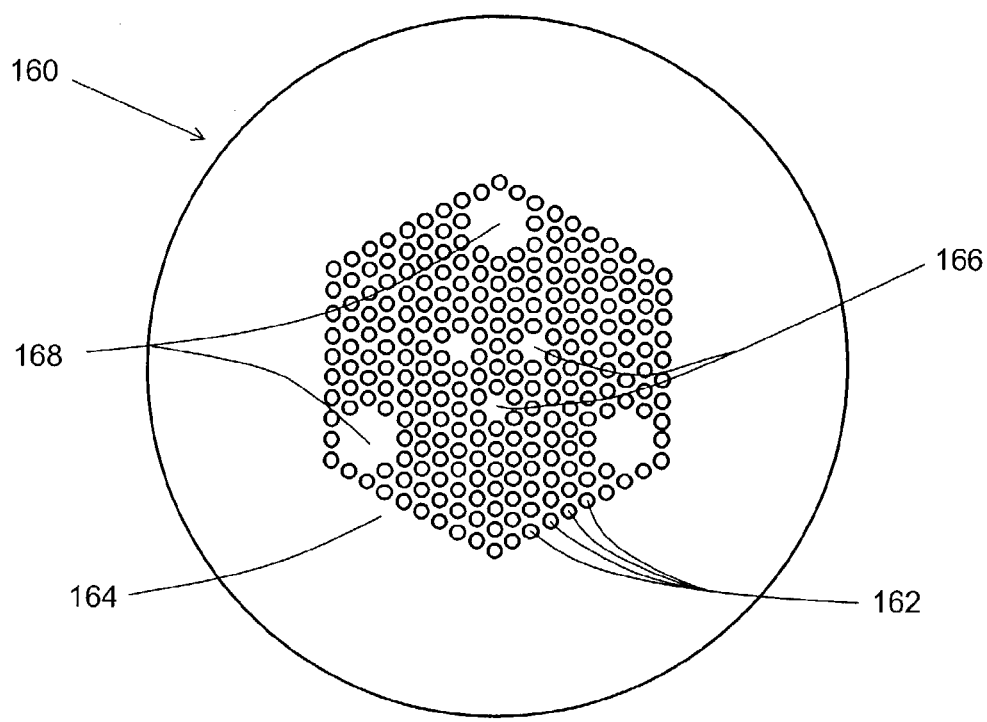
FIG. 10 is a cross-sectional schematic view of a microstructured optical fiber having three main cores, a microstructured region formed from an array of index elements, and three alignment cores.
Figure 11:
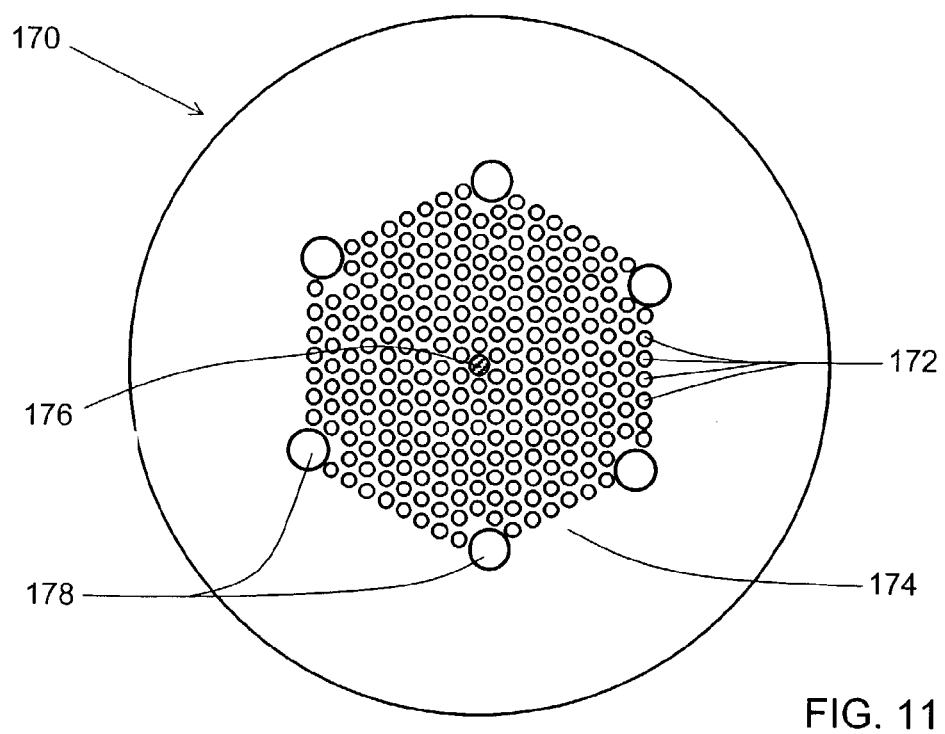
FIG. 11 is a cross-sectional schematic view of a microstructured optical fiber having one main core, a microstructured region, and six alignment cores.
Figure 12:
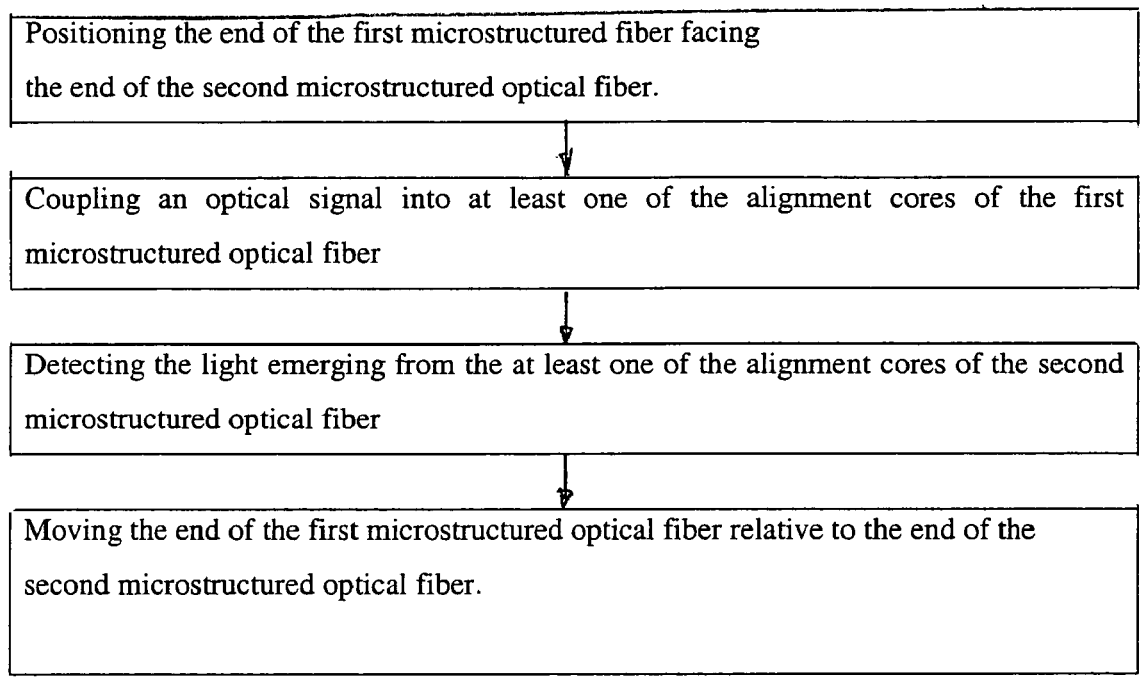
FIG. 12 is a flowchart illustrating a method of splicing micro structured optical fibers.

The microstructured optical fibers depicted in FIGS. 1–5 are embodiments of the invention in which the main cores are photonic band gap-guided cores, and wherein the microstructured regions include photonic band gap structures. An alternative embodiment of the invention is shown in FIG. 9. Microstructured optical fiber 150 has a main core 152 surrounded by a microstructured region formed from a ring of index elements 154. In the embodiment of FIG. 9, index elements 154 are holes formed in the matrix material 156. Main core 152 is surrounded by low refractive index elements; guiding is achieved via index confinement. Microstructured optical fiber 150 also includes four alignment cores 158, formed from regions of high index material embedded in matrix material 156. FIG. 10 shows microstructured optical fiber 160, which has a microstructured region including a periodic array of index elements 162 disposed in matrix material 164. In the embodiment of FIG. 10, index elements 162 are formed from a solid material having a lower refractive index than matrix material 164. The periodic array surrounds a set of three main cores 166, each formed by the omission of one index element from the periodic array. The periodic array does not necessarily have a photonic band gap; propagating modes in the main cores 166 are supported by the index confinement provided by the lower refractive index elements 162. Microstructured optical fiber 160 also includes three alignment cores 168, each formed by the omission of seven index elements from the periodic array. The alignment cores 168 have a much larger effective area than the main cores 166. FIG. 11 shows another alternative microstructured optical fiber 170, which has a periodic array of index elements 172. In the embodiment of FIG. 11, the index elements are holes formed in matrix material 174. Microstructured optical fiber includes main core 176, formed from the substitution of an index element 172 with a high refractive index erbium-doped glass material; and six alignment cores 178, formed from high refractive index material embedded in matrix material 174. In order to simplify alignment during splicing or coupling, the alignment cores of the microstructured optical fibers of FIGS. 9, 10 and 11 have much larger effective areas than the main cores.

The propagating mode or modes guided by the set of main cores has a symmetry around the central axis of the fiber. In especially desirable embodiments of the present invention, the microstructured fiber includes a set of alignment cores having substantially the same symmetry around the central axis of the fiber as the propagating mode or modes guided by the set of main cores. For example, FIG. 10 shows a microstructured optical fiber 160 having a set of main cores 162 disposed symmetrically around the central axis of the fiber. The set of main cores has a $C_3$ rotation axis; the alignment cores 168 are likewise disposed about the central axis with a $C_3$ rotation axis. The microstructured optical fiber 170 of FIG. 11 has a main core 176 that supports a hexagonally symmetric propagating mode; alignment cores 178 are hexagonally disposed about the central axis. The alignment cores may be arranged with a symmetry that is a fraction of the symmetry of a propagating mode, as described hereinabove. For example, the propagating mode supported by the main core may have a $C_6$ rotation axis; the alignment cores may be arranged with a $C_3$ rotation axis (i.e. $C_{(6/2)}$), or a $C_2$ rotation axis (i.e. $C_{(6/3)}$).

Another embodiment of the invention provides a method for coupling two microstructured optical fibers. A first microstructured optical fiber and a second microstructured optical fiber, each having a set of main cores and at least one alignment core as described above, are provided. The position of the at least one alignment core relative to the main core is desirably substantially the same in both fibers. An end of the first microstructured optical fiber is positioned facing an end of the second microstructured fiber. At optical signal is coupled into one of the at least one alignment cores at the other end of the first microstructured optical fiber, and a detector is coupled to the other end of the corresponding alignment core of the second microstructured optical fiber. The end of the first microstructured optical fiber is moved relative to the end of the second microstructured optical fiber until the throughput power received at the detector is maximized. Actively aligning the alignment cores of the two microstructured optical fibers serves to align the main cores to one another. At this point, the fibers may be coupled together temporarily or permanently using methods familiar to the skilled artisan. When using microstructured optical fibers in which the main cores are well-centered relative to the external surface of the fiber, the step of aligning the alignment cores may be performed by physically aligning the microstructured optical fibers, and rotating one relative to the other until the throughput power is maximized.

The microstructured optical fibers of the present invention may be fabricated using stack-and-draw methods familiar to the skilled artisan. To form a microstructured optical fiber preform, hexagonal-sided capillaries and rods may be stacked together in a sleeve tube to form an assembly, which can be fused and reduced in radial scale in a redraw step. The redrawn body can be etched with $NH_4F.HF$ to enlarge the size of the holes. The embedded index-guided cores of FIG. 4 can be formed by drilling longitudinal holes in an annular glass body and inserting rods having the desired refractive index profile in the drilled holes. The preform is then drawn into the optical fiber. Methods for fabricating microstructured optical fibers are described in more detail in U.S. Pat. Nos. 6,243,522; 6,334,017; 6,445,862; and 6,444,133, and U.S. patent application Ser. Nos. 10/067,644; 10/085,785; 10/171,335; 10/171,337; and 10/232,099, each of which is hereby incorporated herein by reference in its entirety. The microstructured optical fibers of the present invention may be provided with one or more polymeric coatings, as is familiar to the skilled artisan. While the microstructured optical fibers described herein are constructed from silica-based glasses, the skilled artisan will understand that they may be made from other materials, such as chalcogenide glasses and polymer materials.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A microstructured optical fiber comprising
a photonic band gap-guided core; and
at least one index-guided core; and
a microstructured cladding comprising a photonic band gap structure surrounding said photonic band gap-guided core.

2. The microstructured optical fiber of claim 1, wherein the photonic band gap structure comprises a periodic array of index elements in a matrix material, the index elements having a substantially different refractive index than the refractive index of the matrix material, the photonic band gap structure having an effective refractive index.

3. The microstructured optical fiber of claim 2 wherein the distance between each index-guided core and the photonic band gap-guided core is at least about two times the pitch of the periodic array.

4. The microstructured optical fiber of claim 2 wherein the at least one index-guided core is formed as a disruption in the periodic array of index elements.

5. The microstructured optical fiber of claim 4 wherein the disruption in the periodic array of elements comprises the substitution of at least one index element with a guiding element, the guiding element having a higher refractive index than the effective refractive index of the photonic band gap structure; or the substitution of at least one index element with matrix material.

6. The microstructured optical fiber of claim 1 wherein the at least one index-guided core is positioned so as not to substantially affect the optical propagation properties of the photonic band gap-guided core.

7. The microstructured optical fiber of claim 1 further comprising an outer cladding material surrounding the photonic band gap-guided core, and wherein the at least one index-guided core is embedded in the outer cladding material.

8. The microstructured optical fiber of claim 1 having a plurality of index-guided cores which are not concentric with said photonic band gap-guided core.

9. The microstructured optical fiber of claim 1 having a plurality of index-guided cores wherein the photonic band gap-guided core supports a photonic band gap-guided mode having a symmetry around the central axis of the fiber, and wherein the plurality of index-guided cores are arranged such that the arrangement of index-guided cores has substantially the same symmetry around the central axis of the fiber as the photonic band gap-guided mode.

10. The microstructured optical fiber of claim 1 having a plurality of index-guided cores, wherein the photonic band gap-guided core supports a photonic band gap-guided mode having a symmetry around the central axis of the fiber, and wherein the plurality of index-guided cores is arranged with a symmetry that is a fraction of the symmetry of a the photonic band gap-guided mode.

11. The microstructured optical fiber of claim 1 wherein at least one of the index-guided cores is doped with a narrow-band absorber.

12. A method of locating a discontinuity in a microstructured optical fiber of claim 1, the method comprising the steps of
introducing light into at least one of the index-guided cores;
allowing the light to interact with the discontinuity; and
detecting the light.

13. The method of claim 12 wherein the light is reflected by the discontinuity, and wherein optical time domain reflectometry is used to locate the discontinuity.

14. The method of claim 12 wherein the light is scattered by the discontinuity, and wherein the discontinuity is located by detecting the scattered light.

15. A method of monitoring a property of a microstructured optical fiber of claim 1 during the drawing thereof, the method comprising the steps of
allowing a light beam to interact with the at least one index-guided core; and
detecting the light beam.

16. A microstructured optical fiber comprising
a set of main cores;
a cladding comprising a microstructured region surrounding the set of main cores; and
at least alignment core, the alignment cores having substantially different optical propagation properties than the main cores.

17. The microstructured optical fiber of claim 16 wherein the set of main cores is symmetrically disposed along the central axis of the fiber.

18. The microstructured optical fiber of claim 17 wherein the microstructured optical fiber includes a plurality of alignment cores, and wherein the alignment cores are arranged such that the arrangement of alignment cores has substantially the same symmetry around the central axis of the fiber as the set of main cores.

19. A method of splicing an end of a first microstructured optical fiber of claim 16 to an end of a second microstructured optical fiber of claim 16, the method comprising the steps of positioning the end of the first microstructured fiber facing the end of the second microstructured optical fiber;

coupling an optical signal into at least one of the alignment cores of the first microstructured optical fiber;

detecting the light emerging from the at least one of the alignment cores of the second microstructured optical fiber; and moving the end of the first microstructured optical fiber relative to the end of the second microstructured optical fiber.

\* \* \* \* \*